United States Patent [19]
Nello

[11] Patent Number: 5,921,168
[45] Date of Patent: Jul. 13, 1999

[54] EXPRESS-COFFEE-MACHINE LOADABLE WITH WAFERS

[75] Inventor: Dal Tio Nello, Susegana, Italy

[73] Assignee: C.M.A. S. p. A., Susegana, Italy

[21] Appl. No.: 09/019,371

[22] Filed: Feb. 5, 1998

[30] Foreign Application Priority Data

Feb. 5, 1997 [IT] Italy .................................. MI97A0222

[51] Int. Cl.⁶ .................................................... A47J 31/34
[52] U.S. Cl. ............................ 99/295; 99/303; 99/302 P; 99/302 R; 99/289 R
[58] Field of Search ............................ 99/320 R, 289 R, 99/303, 302 P, 295

[56] References Cited

U.S. PATENT DOCUMENTS

| 3,086,446 | 4/1963 | Totten | 99/303 X |
| 3,374,727 | 3/1968 | Wright | 99/302 R |
| 4,829,889 | 5/1989 | Takeuchi et al. | 99/302 R |

*Primary Examiner*—Reginald L. Alexander
*Attorney, Agent, or Firm*—Bucknam and Archer

[57] ABSTRACT

Express-coffe-machine loadable with wafers (36) of coffee blend for family or professional use, includes a casing (2) containing one vessel (12) for the water to be heated, a boiler (16) in which the water is heated to a pre-established temperature and a unit (4) formed by one fixed lower head (5) and one movable upper head (6), which can be engaged one to the other so as to press a wafer (36) therebetween for delivering a beverage. The movable upper head (6) is carried by an arm (24) connected to a control lever (26), made integral with a fork (28) engaging the lower head (5), an is also provided with a spout (7) for distributing the beverage.

3 Claims, 5 Drawing Sheets

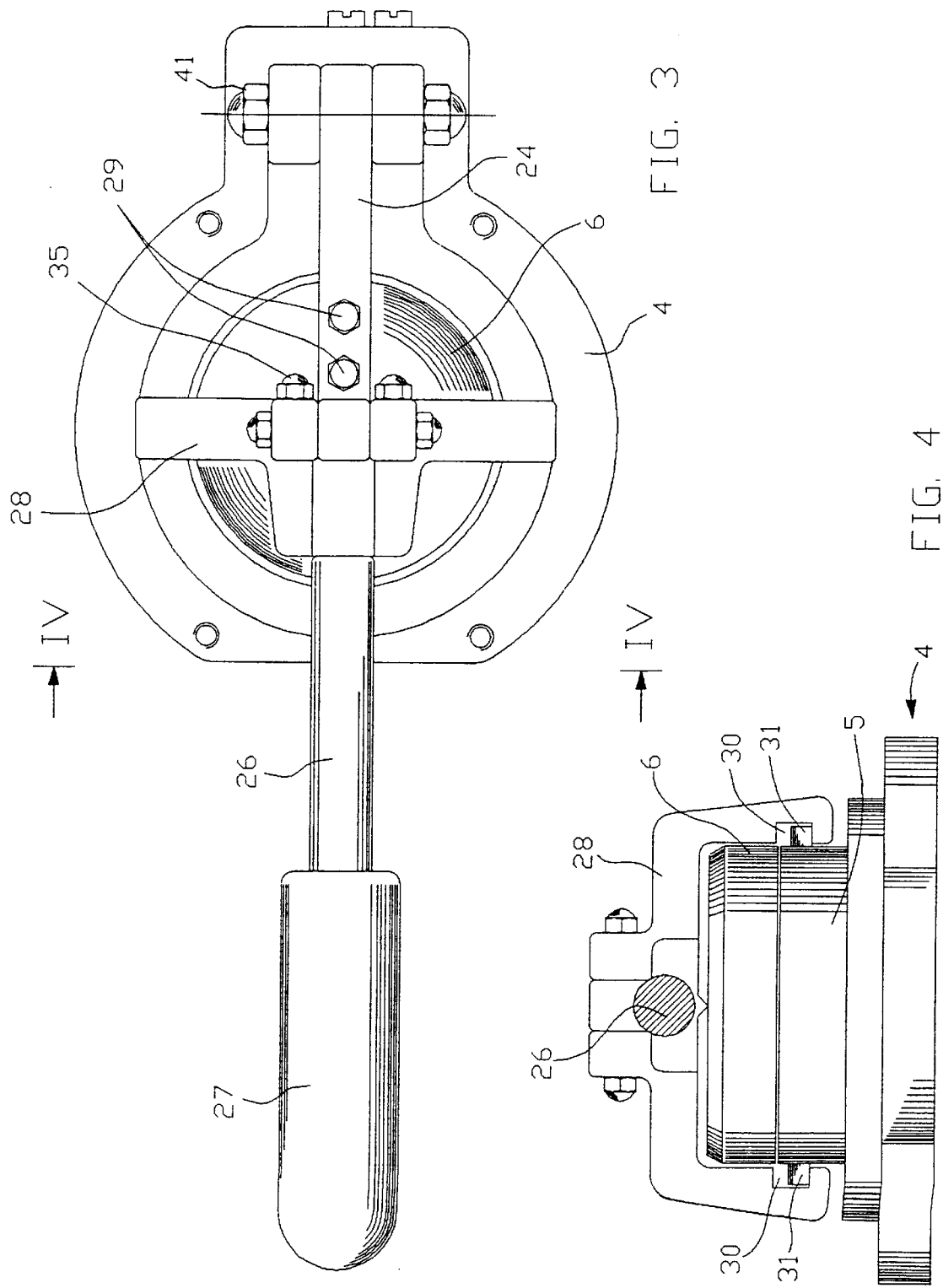

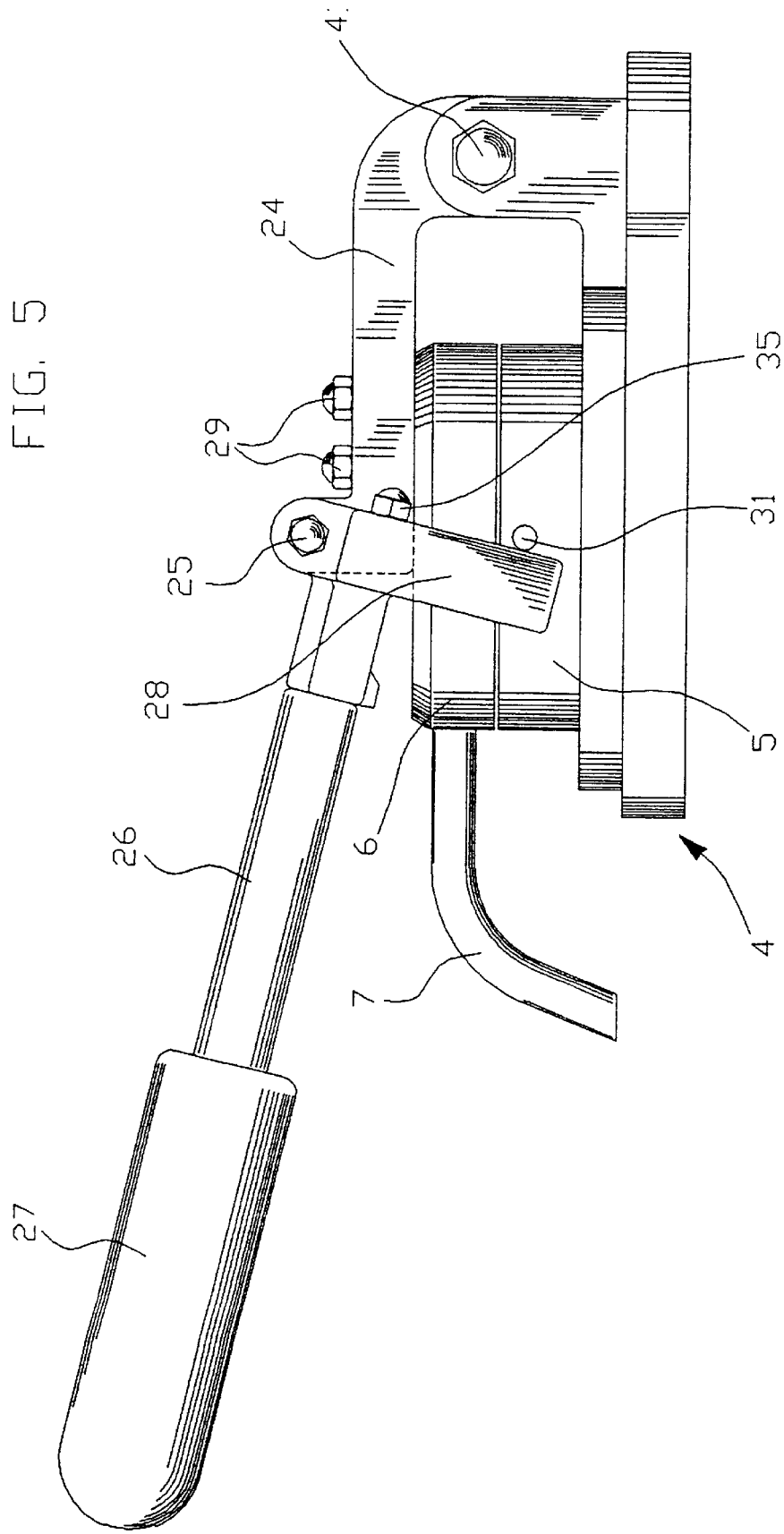

EXPRESS-COFFEE-MACHINE LOADABLE WITH WAFERS

FIELD OF THE INVENTION

The present invention relates to an express-coffee-machine to loaded with wafers for domestic use, for offices and the like.

BACKGROUND OF THE PRIOR ART

There are known machines for preparing coffee loaded with preassembled wafers. These machines are provided with a boiler situated above with two heads between which the wafer containing the ground coffee blend is arranged. After having approached both heads to each other by operating crank mechanisms, the water, which is heated and submitted under pressure by means of an electric pump is filtered through the wafer thereby producing the desired beverage.

A drawback of these machines is due to the structural complications related to the system of approaching both heads which in the manual solution must be operated by means of a lever situated in front of or laterally to the machine.

Another drawback of these machines relates to the impossibility of obtaining an upper opening because of the presence of the boiler which makes less practical the loading of the machine and very difficult the cleaning of the same in the zone of the infusion unit.

SUMMARY OF THE INVENTION

The object of the present invention consists of eliminating said drawbacks by offering an express-coffee-machine with wafers which is structurally simple and can be easily operated when opening and closing it and easy to be cleaned.

This and other objects are achieved with the coffee-machine with wafers according to the invention.

Further characteristics of the invention will appear clearer thanks to the detailed description which follows, relating to a simple embodiment thereof and therefore a not-limiting embodiment thereof, illustrate in the attached drawings, wherein:

FIG. 3 is a top plan view of the sole wafer pressing unit of the coffee machine according to the invention;

FIG. 4 is a cross sectional view according to the line IV—IV of FIG. 3;

FIG. 5 shows a side view of a first disengaged position of the wafer pressing unit of the coffee machine according to the invention;

Figure 1:
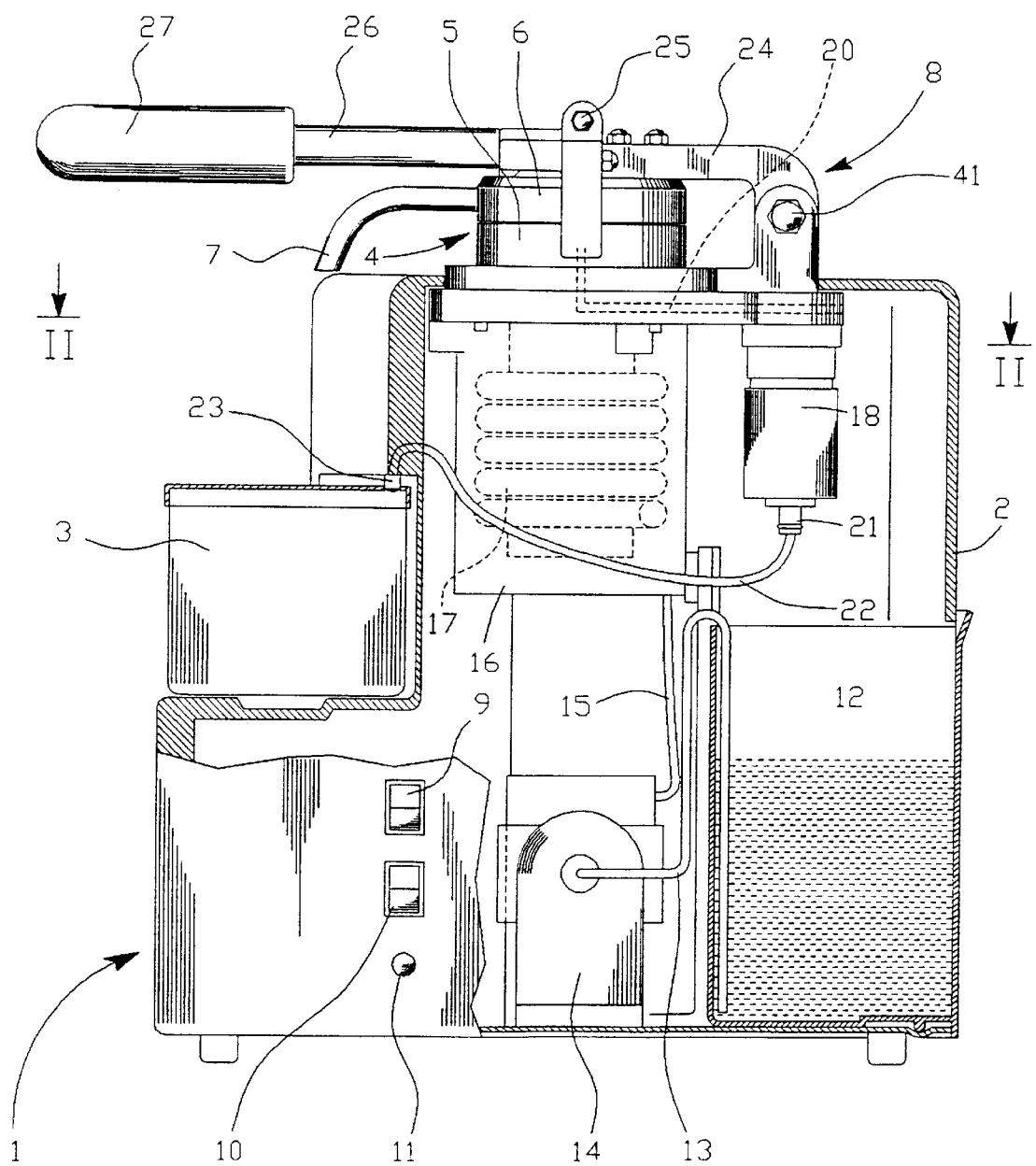
FIG. 1 is a schematic middle cross sectional view with some parts the coffee-machine according to the invention shown.

In FIG. 1 there is shown a coffee machine 1 with wafers according to the invention, including a casing 2, an extractable vessel 3, a unit 4 for pressing the wafer 36 (FIG. 6) comprising one first fixed lower head 5 which can engage a second movable upper head 6 by means of lever closing means 8. This second head 6 is also provided with a spout 7 for distributing the beverage.

On the casing 2 there are provided one first main switch 9 for supplying a resistance 17, a second switch 10 to actuate the distribution of the beverage and a warning light 11 for controlling the temperature of the water to be infused on the wafer 36 containing the ground coffee blend.

By operating the first switch 9, the resistance 17 of boiler 16 is supplied and the water contained therein is heated and when it reaches the desired temperature (for example 98° C.), one thermostat, not shown in the figure, switches off the warning light 11, which was switched on when the device 1 was operated, showing that the water has reached a pre-established temperature level.

When the second switch 10 is changed over, an electric pump 14 sucking the water loaded into one vessel 12 by means of a first tube 13 is actuated and leads it through a second tube 15 into the boiler 16.

Figure 2:
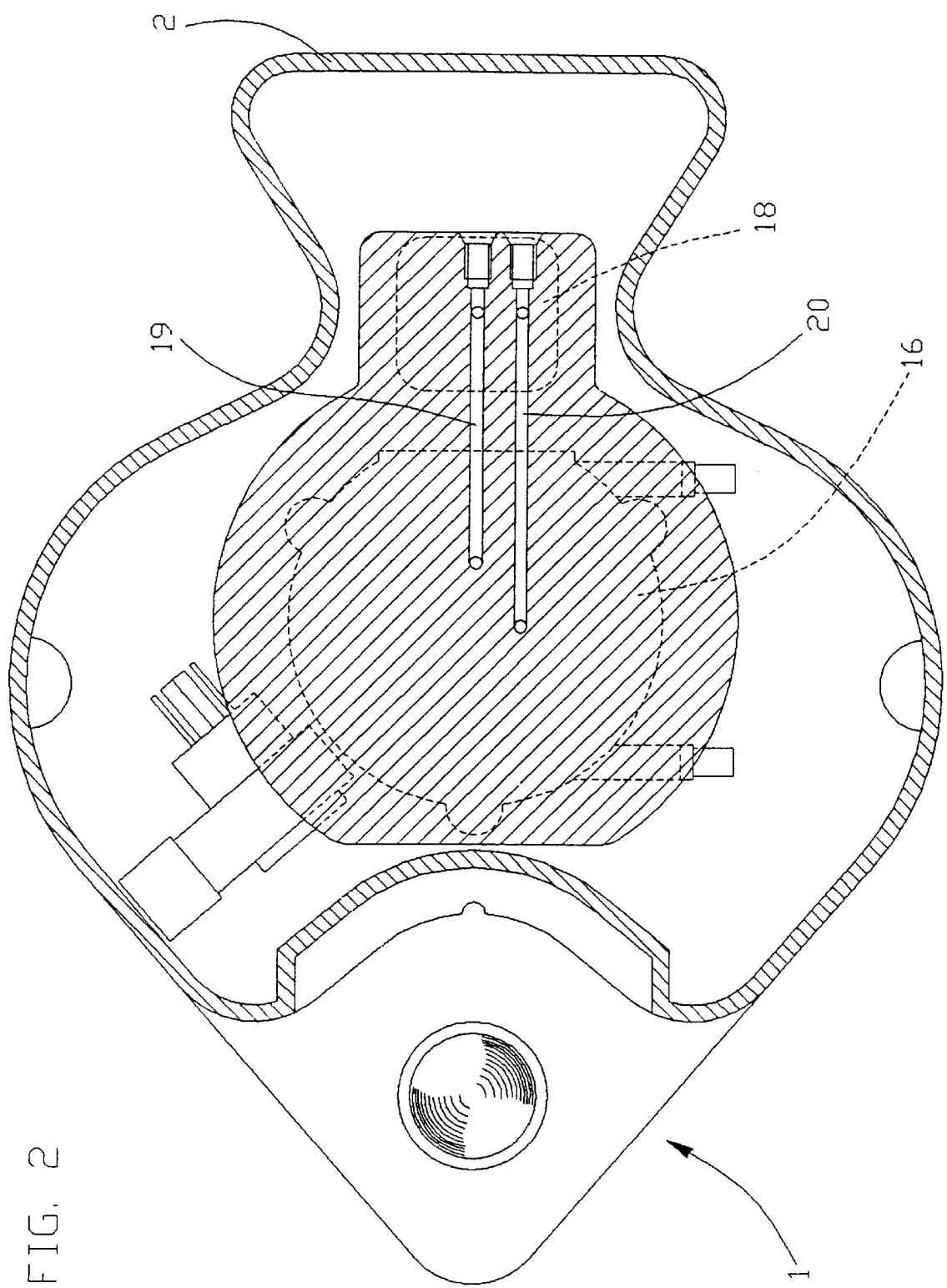
FIG. 2 is a cross sectional view according to the line II—II of FIG. 1.

The changed over condition of the second switch 10 contemporaneously actuates a solenoid valve 18 which, as the cross sectional view of FIG. 2 shows more in detail, is communicating with the boiler 16 by means of a first conduit 19 and with the head 5 by means of a second conduit 20.

Figure 6:
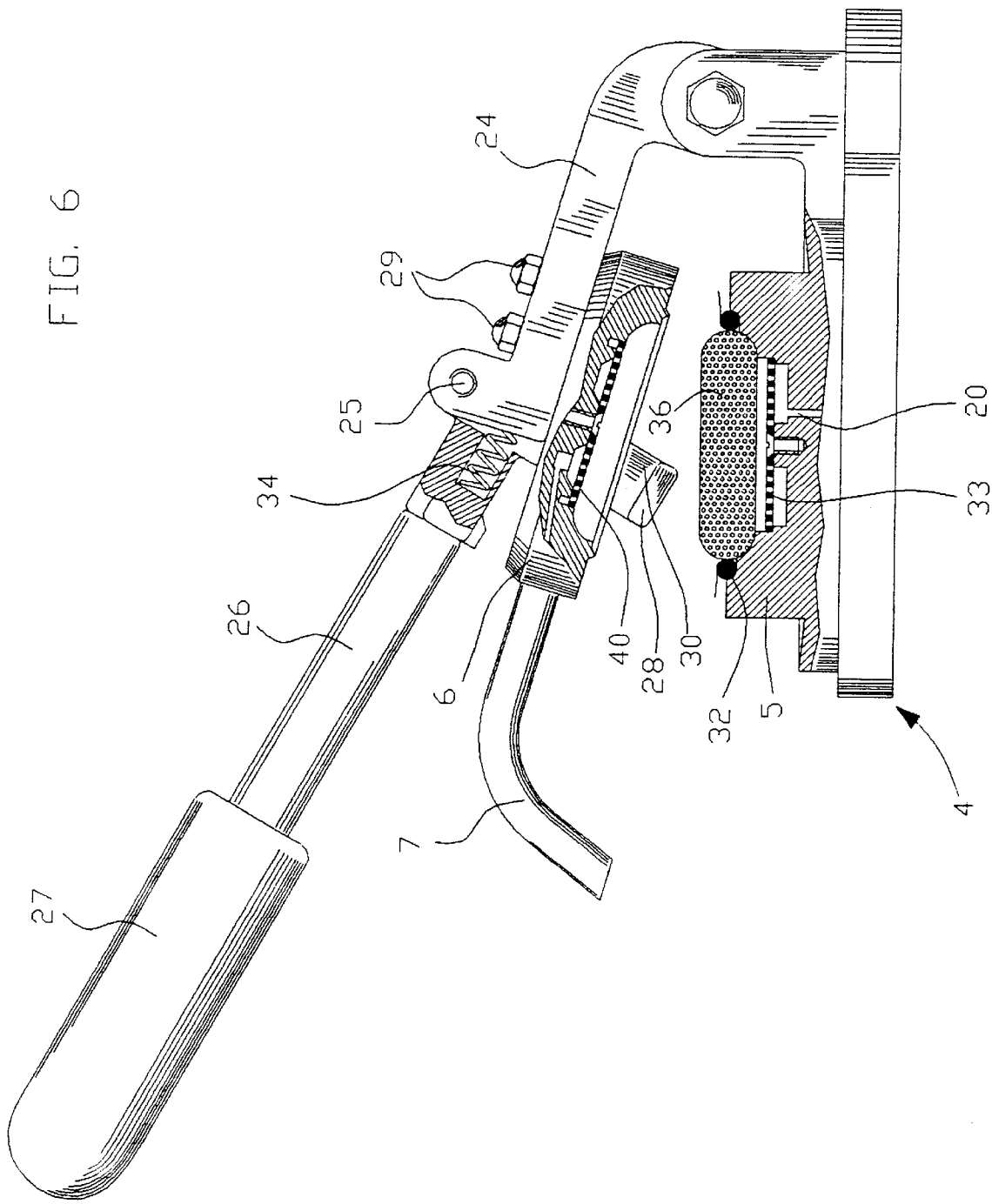
FIG. 6 is a view similar to FIG. 5 showing an opening position of the wafer pressing unit of the coffee machine according to the invention.

The solenoid valve 18 puts into communication the conduits 19, 20 by supplying with heated water under pressure the head 5 provided with a filter 33 and supporting a gasket 32, which, as shown in FIG. 6, is provided for sealing the upper head 6. This water, pushed through the wafer 36 containing the coffee blend arranged between the first and the second head 6, provided with a filter 40 too, lets the beverage flow through the spout 7.

In order to guarantee the safety of the boiler 16, the solenoid valve 18 is provided with a drain valve 21 connected by means of a third tube 22 with an opening 23 so as to permit the condensed water to be drained into the removable vessel 3.

With particular reference to FIGS. 3 and 6 there is shown the lever closing device 8 including an arm 24 which is hinged at its first end portion on the position 41 with the pressing unit 4, in particular with the structure carrying the fixed lower head 5. The head 6 is secured to this arm 24 by means of fixing elements 29, particularly studs, as shown in the Figures. The other end of the arm 24 is connected by means of a joint 25 with a control lever 26 including a handle 27. A fork 28 is connected integral with and perpendicular to said lever 26, at the end portions of which, as FIG. 4 shows in detail, there are foreseen some cavities 30 engaging the projections 31 provided on the head 5.

In order to close the unit 4 starting from the position illustrated in FIG. 6, the head 6 is initially lowered onto the head 5 by making a first rotation of the arm 24 hinged with the unit 4, until the head 6 engages the head 5 as FIG. 5 shows.

In order to provide that the fork 28 be in a proper engagement position with respect to the projection 31, when the two heads 5 and 6 are into contact, the lever 26 contains a resilient element 34 (FIG. 6) in particular a spring, so that when the closing device 8 is not operating, the lever 26 is moved away of an opening angle with respect to the arm 24 thereby permitting the fork 28, which in turn is integral with the arm 24, to attain the proper engagement position.

The opening angle of the lever 26 with respect to the arm 24 is regulated by means of blocks 35. Thereafter, a further pressure on the lever 26 causes a rotation of the lever 26 with respect to the joint 25, by engaging the cavities 30 of the lever 26 with the projections 31 of the fixed head 5.

Cavities 30 have flared edges in order to facilitate the insertion of projections 31. According to what has been explained, the advantages of the coffee machine according to the invention are clear because the machine is provided with a simplified closing unit which makes the operations of loading and cleaning thereof easier.

I claim:

1. An express coffee machine loadable with wafers (36) of coffee blend, including a casing (2) containing one vessel (12) for water to be heated, a boiler (16) provided with a heating resistance (17) and communicating with said vessel (12) through an electric pump (14), said pump being actuated by switch means (10) in order to suck the water from said vessel (12) and lead it into said boiler (16), for being heated by said heating resistance (17) to a pre-established temperature and also including a unit (4) comprising one fixed lower head (5) communicating with said boiler (16) through a solenoid valve (18) and one movable upper head (6) carried by an arm (24) hinged at one end portion and connected at the other end portion thereof by means of a joint (25) with a control lever (26), said lever being provided with a handle (27), said movable upper head (6) being moved by said control lever (26) from a position disengaged from said lower head (5) to a position engaged with said lower head (5), in which a wafer (36) is pressed between both heads (5,6), the heated water being supplied from said boiler (16), when said solenoid valve (18) is actuated, by passing through said wafer (36) so as to make a beverage, wherein said control lever (26) is connected integrally with a fork (28) provided with end portions in which cavities (30) are present, and wherein said lower head (5) is provided with projections (31) engaging the cavities (30) of said fork (28) in the position in which said movable upper head (6) is engaged with said lower head (5), said cavities (30) being provided with flared edges in order to facilitate the introduction of said projections (31) therein and wherein said upper head (6) is provided with a spout (7) for distributing the beverage.

2. The express coffee machine according to claim 1, wherein said control lever (26) contains a resilient spring element (34), said spring moving away said lever (26) of an opening angle with respect to said arm (24) when it is inoperative.

3. The express coffee machine according to claim 2, which comprises blocks (35) and wherein said control lever (26) co-operates with said blocks (35) for regulating the opening angle of the same lever with respect to said arm (24).

* * * * *